US012700124B2

(12) United States Patent
Kim et al.

(10) Patent No.: US 12,700,124 B2
(45) Date of Patent: Aug. 4, 2026

(54) METHOD AND DEVICE FOR DETERMINING LOCATION OF OBJECT IN LANE MAP

(71) Applicant: 42DOT INC., Seoul (KR)

(72) Inventors: Ho Sung Kim, Goyang (KR); Jong Bum Choi, Seoul (KR); Ja Yong Lee, Seongnam (KR)

(73) Assignee: 42DOT INC., Seoul (KR)

( * ) Notice: Subject to any disclaimer, the term of this patent is extended or adjusted under 35 U.S.C. 154(b) by 301 days.

(21) Appl. No.: 18/563,933

(22) PCT Filed: May 26, 2022

(86) PCT No.: PCT/KR2022/007516
§ 371 (c)(1),
(2) Date: Nov. 24, 2023

(87) PCT Pub. No.: WO2022/250480
PCT Pub. Date: Dec. 1, 2022

(65) Prior Publication Data
US 2024/0257385 A1 Aug. 1, 2024

(30) Foreign Application Priority Data

| | | |
|---|---|---|
| May 26, 2021 | (KR) | 10-2021-0067940 |
| Dec. 1, 2021 | (KR) | 10-2021-0169973 |
| Dec. 1, 2021 | (KR) | 10-2021-0169974 |

(51) Int. Cl.
*G06V 20/56* (2022.01)
*G06T 7/70* (2017.01)
(52) U.S. Cl.
CPC ................ *G06T 7/70* (2017.01); *G06V 20/56* (2022.01); *G06T 2207/30252* (2013.01)

(58) Field of Classification Search
CPC ............. G06T 7/70; G06T 2207/30261; G06T 2207/30256; G06T 2207/30252; G06V 20/56
See application file for complete search history.

(56) References Cited

U.S. PATENT DOCUMENTS

| | | | | |
|---|---|---|---|---|
| 2006/0233424 A1* | 10/2006 | Miyajima | ................. | G06T 7/73 |
| | | | | 382/104 |
| 2007/0064105 A1* | 3/2007 | Ohshima | ................ | H04N 7/186 |
| | | | | 348/143 |

(Continued)

FOREIGN PATENT DOCUMENTS

| | | | | |
|---|---|---|---|---|
| DE | 102015211150 A1 * | 12/2016 | ...... | B60W 30/18154 |
| JP | 2003-085535 A | 3/2003 | | |

(Continued)

OTHER PUBLICATIONS

International Search Report dated Aug. 18, 2022.

*Primary Examiner* — Shaghayegh Azima
(74) *Attorney, Agent, or Firm* — Harvest IP Law, LLP

(57) ABSTRACT

Provided are a method and apparatus for determining a location of an object on a lane map, wherein the method includes acquiring image data captured by a camera mounted on a vehicle, generating feature information regarding a plurality of features included in the image data by performing certain processing on the image data, determining a plurality of features corresponding to a same object in a plurality of pieces of image data, on the basis of a degree of correlation between the plurality of features included in the image data, and determining a location of an object on the lane map, on the basis of location information of the vehicle on the lane map and feature location information on the plurality of pieces of image data.

13 Claims, 14 Drawing Sheets

(56)          References Cited

U.S. PATENT DOCUMENTS

| | | | |
|---|---|---|---|
| 2015/0154229 | A1 | 6/2015 | An |
| 2018/0330526 | A1* | 11/2018 | Corcoran ............... G06V 20/58 |
| 2019/0205659 | A1* | 7/2019 | Cuban .................... G06V 20/41 |
| 2019/0228318 | A1* | 7/2019 | Kwant ................... G06N 3/045 |
| 2019/0236405 | A1* | 8/2019 | Dabeer ............. G01C 21/3867 |
| 2019/0295420 | A1* | 9/2019 | Fu ............................. G06T 7/73 |
| 2020/0202573 | A1* | 6/2020 | O'Hara .................... G06T 7/90 |
| 2021/0150757 | A1* | 5/2021 | Mustikovela ........ G06V 10/242 |
| 2021/0312194 | A1* | 10/2021 | Yang .................... G05D 1/0094 |
| 2022/0042823 | A1* | 2/2022 | Lee ........................ G01C 11/02 |
| 2022/0146276 | A1* | 5/2022 | Golinsky .......... G08G 1/09623 |

FOREIGN PATENT DOCUMENTS

| | | | |
|---|---|---|---|
| JP | 2005347945 | A | 12/2005 |
| JP | 2008146356 | A | 6/2008 |
| JP | 2009-017462 | A | 1/2009 |
| JP | 4273119 | B2 | 6/2009 |
| JP | 2010-286963 | A | 12/2010 |
| JP | 2020-038362 | A | 3/2020 |
| JP | 2020-153956 | A | 9/2020 |
| KR | 1020100026123 | A | 3/2010 |
| KR | 10-1060575 | B1 | 8/2011 |
| KR | 1020120079341 | A | 7/2012 |
| KR | 10-2052114 | B1 | 12/2019 |
| KR | 1020200046437 | A | 5/2020 |
| KR | 10-2125538 | B1 | 6/2020 |
| KR | 1020200065144 | A | 6/2020 |
| KR | 1020200102564 | A | 9/2020 |
| KR | 10-2182498 | B1 | 11/2020 |
| KR | 10-2225321 | B1 | 3/2021 |
| KR | 1020200011566 | A | 2/2022 |

* cited by examiner

FIG. 7
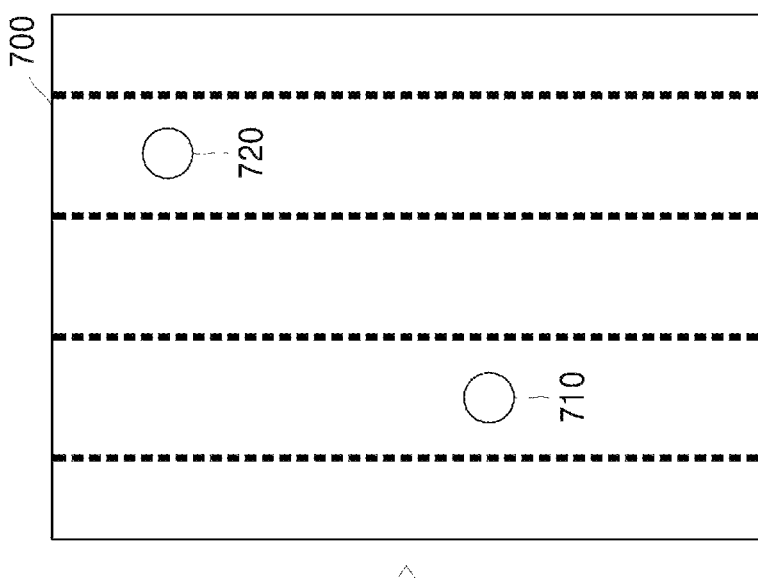
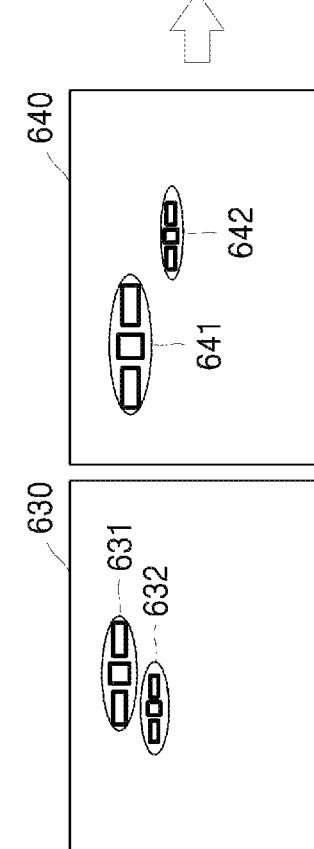

FIG. 11

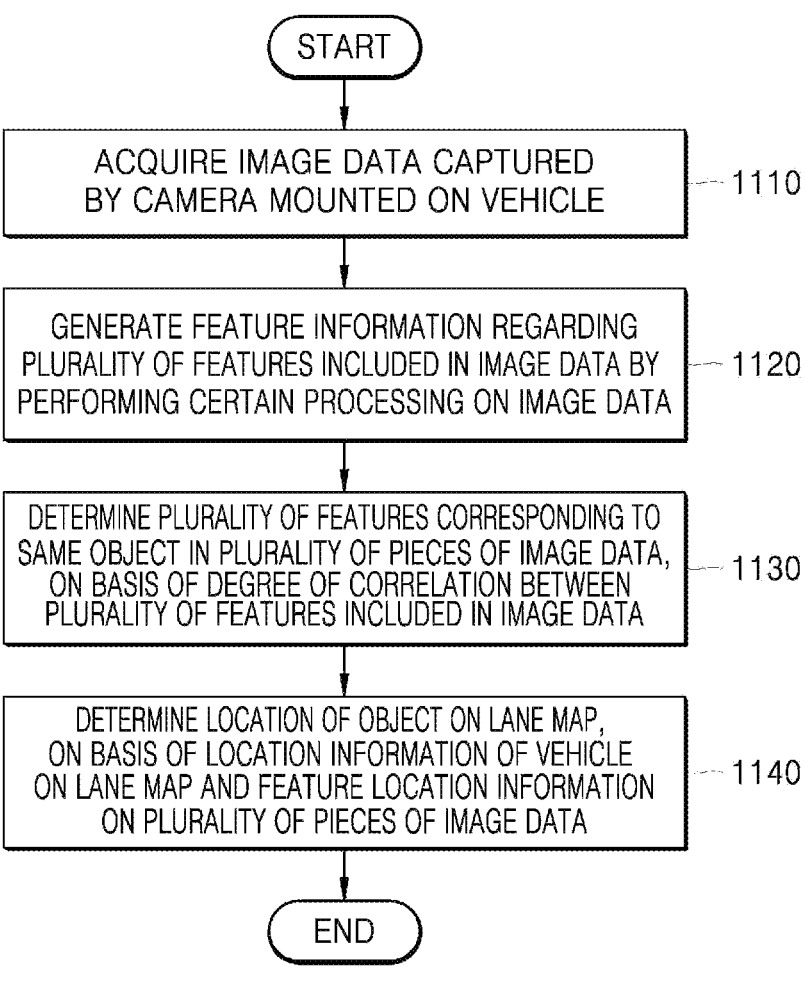

START

ACQUIRE IMAGE DATA CAPTURED
BY CAMERA MOUNTED ON VEHICLE — 1110

GENERATE FEATURE INFORMATION REGARDING
PLURALITY OF FEATURES INCLUDED IN IMAGE DATA BY — 1120
PERFORMING CERTAIN PROCESSING ON IMAGE DATA

DETERMINE PLURALITY OF FEATURES CORRESPONDING TO
SAME OBJECT IN PLURALITY OF PIECES OF IMAGE DATA, — 1130
ON BASIS OF DEGREE OF CORRELATION BETWEEN
PLURALITY OF FEATURES INCLUDED IN IMAGE DATA

DETERMINE LOCATION OF OBJECT ON LANE MAP,
ON BASIS OF LOCATION INFORMATION OF VEHICLE — 1140
ON LANE MAP AND FEATURE LOCATION INFORMATION
ON PLURALITY OF PIECES OF IMAGE DATA

END

METHOD AND DEVICE FOR DETERMINING LOCATION OF OBJECT IN LANE MAP

CROSS REFERENCE TO RELATED APPLICATION(S)

This application is a National Stage of International Application No. PCT/KR2022/007516 filed on May 26, 2022, claiming priority based on Korean Patent Application No. 10-2021-0067940 filed on May 26, 2021, 10-2021-0169973 filed on Dec. 1, 2021 and 10-2021-0169974 filed on Dec. 1, 2021, the disclosures of which are incorporated herein by reference in its entirety.

TECHNICAL FIELD

The present disclosure relates to a method and apparatus for determining a location of an object on a lane map.

BACKGROUND ART

Vehicles traveling on a road may travel on any one lane from among a plurality of lanes included in the road. Vehicles may frequently change lanes while traveling, and situations in which the number of lanes on roads is changed also frequently occurs.

Due to the convergence of information and communication technology and the vehicle industry, smartization of vehicles has rapidly progressed. Due to smartization, vehicles have evolved from simple mechanical systems to smart cars, in particular, autonomous driving has attracted attention as a core technology of smart cars. Autonomous driving refers to a technology that allows vehicles to autonomously reach destinations thereof without drivers manipulating steering wheels, accelerator pedals, brakes, or the like.

Various additional functions related to autonomous driving have been continuously developed, and there is a demand for research on methods capable of providing safe autonomous driving experiences to passengers by controlling vehicles by recognizing and determining driving environments by using various types of data.

Recently, there is a need for research for more accurately displaying, on maps with a lesser amount of computation, various types of objects (e.g., traffic lights, road signs, bumps, and the like) located on or located around roads on which vehicles travel.

The foregoing background art is technical information that the inventor has possessed for derivation of the present disclosure or has acquired during the derivation process of the present disclosure, and may not be necessarily known art disclosed to the general public prior to the filing of the present disclosure.

DESCRIPTION OF THE DISCLOSURE

Technical Problem

The present disclosure provides a method and apparatus for determining a location of an object on a lane map. The problems to be solved by the present disclosure are not limited to the problems mentioned above, and other problems and advantages of the present disclosure that are not mentioned may be understood by the following description and more clearly understood by embodiments of the present disclosure. In addition, it will be appreciated that the problems and advantages to be solved by the present disclosure may be implemented by means and combinations thereof defined in claims.

Technical Solution to Problem

According to an aspect of the present disclosure, a method of determining a location of an object on a lane map includes: acquiring image data captured by a camera mounted on a vehicle; generating feature information regarding a plurality of features included in the image data by performing certain processing on the image data; determining a plurality of features corresponding to a same object in a plurality of pieces of image data, on the basis of a degree of correlation between the plurality of features included in the image data; and determining a location of an object on the lane map, on the basis of location information of the vehicle on the lane map and feature location information on the plurality of pieces of image data.

According to another aspect of the present disclosure, an apparatus for determining a location of an object on a lane map includes: a memory storing at least one program; and a processor configured to perform a calculation by executing the at least one program, wherein the processor is configured to: acquire image data captured by a camera mounted on a vehicle; generate feature information regarding a plurality of features included in the image data by performing certain processing on the image data; determine a plurality of features corresponding to a same object in a plurality of pieces of image data, on the basis of a degree of correlation between the plurality of features included in the image data; and determine a location of an object on the lane map, on the basis of location information of the vehicle on the lane map and feature location information on the plurality of pieces of image data.

According to another aspect of the present disclosure, a computer-readable recording medium has recorded thereon a program for executing the method on a computer.

In addition, another method for implementing the present disclosure, another system, and a computer-readable recording medium storing a computer program for executing the method may be further provided.

Other aspects, features and advantages other than those described above will become apparent from the following drawings, claims and detailed description of the present disclosure.

Effects of the Disclosure

According to the problem solving means of the present disclosure described above, data may be lightened by determining which object is the same within a plurality of pieces of image data by using feature information corresponding to metadata regarding an object without using the entire image data.

BRIEF DESCRIPTION OF DRAWINGS

FIG. 7 is an example view illustrating a method of determining a location of an object on a lane map, according to an embodiment.

FIG. 11 is a flowchart of a method of determining a location of an object on a lane map, according to an embodiment.

BEST MODE

Figure 1:
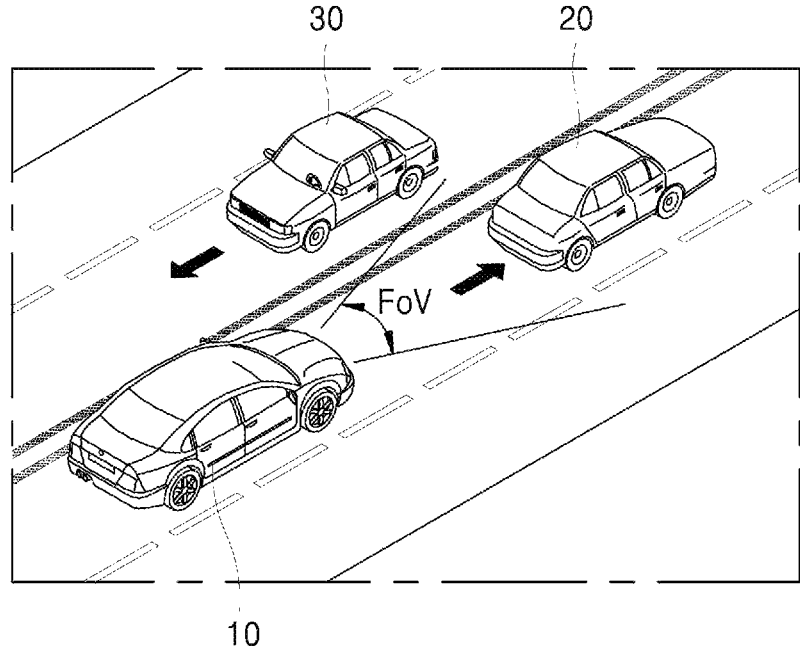
FIGS. 1 to 3 are diagrams illustrating an autonomous driving method according to an embodiment.

The present disclosure relates to a method and apparatus for determining a location of an object on a lane map. The method according to an embodiment of the present disclosure may acquire image data captured by a camera mounted on a vehicle. In addition, the method may generate feature information regarding a plurality of features included in the image data by performing certain processing on the image data. Also, the method may determine a plurality of features corresponding to the same object in a plurality of pieces of image data, on the basis of a degree of correlation between the plurality of features included in the image data. In addition, the method may determine a location of an object on a lane map, on the basis of location information of a vehicle on the lane map and feature location information on the plurality of pieces of image data.

MODE FOR DISCLOSURE

Advantages and features of the present disclosure, and methods of achieving the same will become clear with reference to the detailed description of embodiments taken in conjunction with the accompanying drawings. However, it should be understood that the present disclosure is not limited to embodiments presented below, but may be implemented in various different forms, and includes all modifications, equivalents, and alternatives included in the spirit and scope of the present disclosure. The embodiments presented below are provided to complete the present disclosure and to fully inform those skilled in the art to which the present disclosure belongs. When describing the present disclosure, the detailed description of related known arts, which may obscure the subject matter of the present disclosure, will be omitted.

Terms used herein are only used to describe particular embodiments, and are not intended to limit the present disclosure. As used herein, the singular forms are intended to include the plural forms as well, unless the context clearly indicates otherwise. It will be further understood that the terms "comprises," "comprising," "have," and/or "having," when used herein, specify the presence of stated features, integers, steps, operations, elements, and/or components, but do not preclude the presence or addition of one or more other features, integers, steps, operations, elements, components, and/or groups thereof.

Some of the embodiments may be represented as functional block structures and various processing operations.

Some or all of these functional blocks may be implemented as a varying number of hardware and/or software components that perform particular functions. For example, functional blocks of the present disclosure may be implemented by one or more microprocessors, or may be implemented by circuit components for a certain function. Also, for example, the functional blocks of the present disclosure may be implemented in various programming or scripting languages. The functional blocks may be implemented as an algorithm running on one or more processors. Also, the present disclosure may employ related art for electronic environment configuration, signal processing, and/or data processing, and the like. The terms such as "mechanism," "element," "means," and "component" will be used broadly, and are not limited to mechanical and physical components.

In addition, connecting lines or connecting members between components shown in the drawings are only examples of functional connections and/or physical or circuit connections. In an actual apparatus, connections between components may be represented by various functional connections, physical connections, or circuit connections that may be replaced or added.

Hereinafter, a vehicle may refer to any type of transportation means such as a car, a bus, a motorcycle, a kickboard, or a truck, that is used with an engine to move people or objects.

Hereinafter, the present disclosure will be described in detail with reference to the accompanying drawings.

Figure 2:
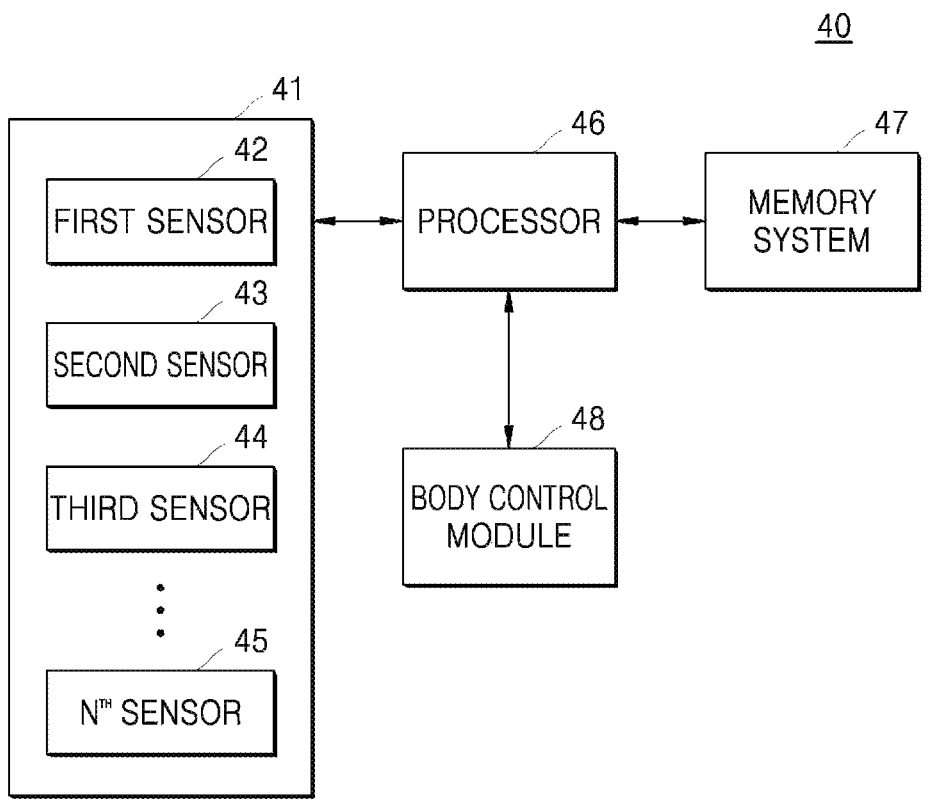
Figure 3:
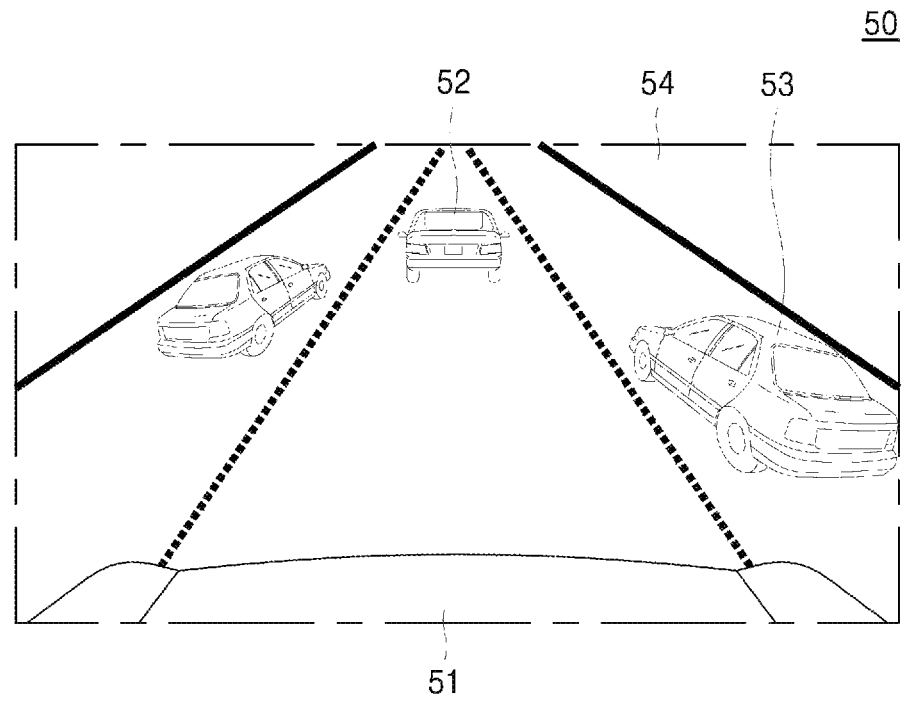

FIGS. 1 to 3 are diagrams illustrating an autonomous driving method according to an embodiment.

Referring to FIG. 1, an autonomous driving apparatus according to an embodiment of the present disclosure may be mounted on a vehicle to implement an autonomous vehicle 10. The autonomous driving apparatus mounted on the autonomous vehicle 10 may include various types of sensors for collecting surrounding situation information. As an example, the autonomous driving apparatus may detect movement of a preceding vehicle 20 running in front via an image sensor and/or an event sensor mounted on the front of the autonomous vehicle 10. The autonomous driving apparatus may further include sensors for detecting the front side of the autonomous vehicle 10, another driving vehicle 30 operating in a side lane, a pedestrian around the autonomous vehicle 10, and the like.

As illustrated in FIG. 1, at least one of sensors for collecting situational information around the autonomous vehicle may have a certain field of view (FoV). For example, when a sensor mounted on the front of the autonomous vehicle 10 has a field of view (FoV) as shown in FIG. 1, information detected from the center of the sensor may have a relatively high significance. In other words, the information detected from the center of the sensor may have the relatively high significance because most of information corresponding to movement of the preceding vehicle 20 is included in the information detected from the center of the sensor.

The autonomous driving apparatus may control the movement of the autonomous vehicle 10 by processing, in real time, information collected by sensors of the autonomous vehicle 10, and may store, in a memory device, at least some of the information collected by the sensors.

Referring to FIG. 2, an autonomous driving apparatus 40 may include a sensor unit 41, a processor 46, a memory system 47, a body control module 48, and the like. The sensor unit 41 may include a plurality of sensors 42 to 45, and the plurality of sensors 42 to 45 may include an image sensor, an event sensor, an illuminance sensor, a GPS device, an acceleration sensor, and the like.

Data collected by the sensors 42 to 45 may be transmitted to the processor 46. The processor 46 may store, in the memory system 47, the data collected by the sensors 42 to 45, and may determine movement of a vehicle by controlling the body control module 48 on the basis of the data collected by the sensors 42 to 45. The memory system 47 may include two or more memory devices, and a system controller for controlling the memory devices. Each of the memory devices may be provided as a single semiconductor chip.

In addition to the system controller of the memory system 47, each of the memory devices included in the memory system 47 may include a memory controller, and the memory controller may include an artificial intelligence (AI) operation circuit, such as a neural network. The memory controller may generate calculation data by assigning a certain weight to data received from the sensors 42 to 45 or the processor 46, and may store the calculation data in a memory chip.

FIG. 3 is a diagram illustrating an example of image data acquired by a sensor of an autonomous vehicle having an autonomous driving apparatus mounted thereon. Referring to FIG. 3, image data 50 may be data acquired by a sensor mounted on the front of an autonomous vehicle. Therefore, the image data 50 may include a front portion 51 of the autonomous vehicle, a preceding vehicle 52 on the same lane as the autonomous vehicle, a driving vehicle 53 around the autonomous vehicle, a background 54, and the like.

From among the image data 50 according to the embodiment shown in FIG. 3, data of regions in which the front portion 51 of the autonomous vehicle and the background 54 appear may be data that is unlikely to affect operation of the autonomous vehicle. In other words, the front portion 51 of the autonomous vehicle and the background 54 may be regarded as data having a relatively low significance.

However, a distance to the preceding vehicle 52, movement of the driving vehicle 53 to change a lane, and the like may be highly significant factors for safe operation of the autonomous vehicle. Accordingly, from among the image data 50, data of a region including the preceding vehicle 52, the driving vehicle 53, and the like may have a relatively high significance for the operation of the autonomous vehicle.

A memory device of the autonomous driving apparatus may store the image data 50 received from the sensor by assigning different weights to respective regions of the image data 50. For example, a high weight may be assigned to the data of the region including the preceding vehicle 52, the driving vehicle 53, and the like, and a low weight may be assigned to the data of the regions in which the front portion 51 of the autonomous vehicle and the background 54 appear.

Figure 4:
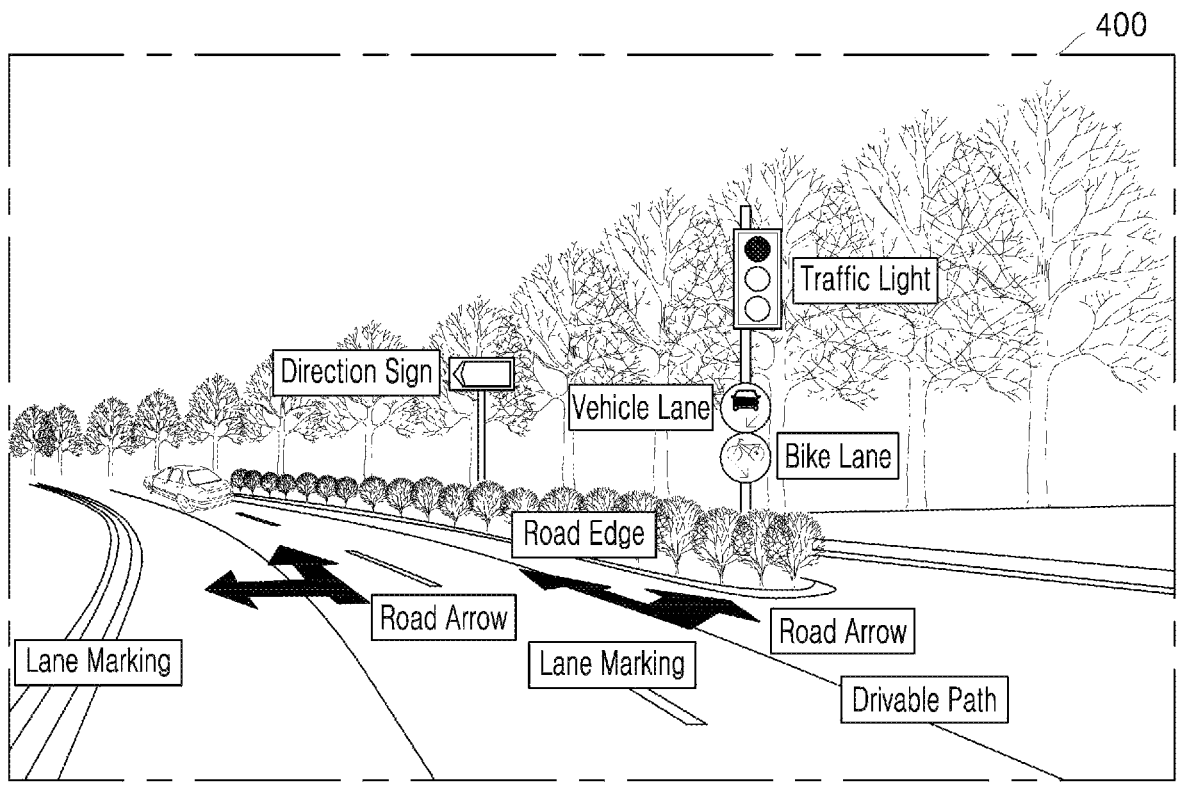
FIG. 4 is a view illustrating an example of a plurality of objects included in image data, according to an embodiment.

FIG. 4 is a view illustrating an example of a plurality of objects included in image data, according to an embodiment.

Image data, which is acquired from a camera mounted on a vehicle at a particular point in time, may include a plurality of objects.

Information regarding an object includes object type information and object attribute information. Here, the object type information is index information indicating a type of an object, and includes a group, which is a large range, and a class, which is a detailed range. In addition, the object attribute information represents attribute information regarding a current state of the object, and includes motion information, rotation information, traffic information, color information, and visibility information.

In an embodiment, the group and the class included in the object type information may be as shown in Table 1 below, but are not limited thereto.

TABLE 1

| Group | Class |
|---|---|
| Flat | Road, Sidewalk, Parking, Ground, Crosswalk |
| Human | Pedestrian, Rider |
| Vehicle | Car, Truck, Bus, Bike, Mobility |
| Construction | Building, Wall, Guard rail, Tunnel, fence soundproof wall, gas station, IC, pylon |
| Object | Pole, Traffic sign, Traffic light, color corn |
| Nature | Vegetation, Terrain, Paddy field, river, lake |
| Void | Static |
| Lane | Dotted line, Solid line, Dotted and Solid line, Double Solid line |
| Sky | Sky |
| Animal | Dog, Cat, bird, etc. |

In addition, information included in the object attribute information may include Action, Rotate, Traffic info, color, and Visibility information.

The Action information may represent motion information of the object and may be defined as stop, parking, movement, or the like. In the case of a vehicle, stop, parking, and movement may be determined as object attribute information, and in the case of an object that may not move, such as a traffic light, a stop, which is a default value, may be determined as object attribute information.

The Rotate information may represent rotation information of the object and may be defined as front, rear, horizontal, vertical, side, and the like. In the case of a vehicle, object attribute information may be determined as front, rear, and side, and for a traffic light in a horizontal or vertical direction, object attribute information may be determined as horizontal or vertical.

The Traffic info may refer to traffic information of the object, and may be defined as an indication, caution, regulation, and auxiliary sign, and the like of a traffic sign. The Color may refer to color information of the object, and may represent a color of the object, or colors of a traffic light and a traffic sign.

For example, object attribute information of a particular vehicle may be determined as a stop, front, a red color, and a visibility level 3.

Referring to FIG. 4, objects, which are included in an image 400 acquired from a camera, may be a traffic light, a sign, a current driving lane (ego-lane), an intersection, a road marking, a bump, and the like, but are not limited thereto.

Figure 5A:
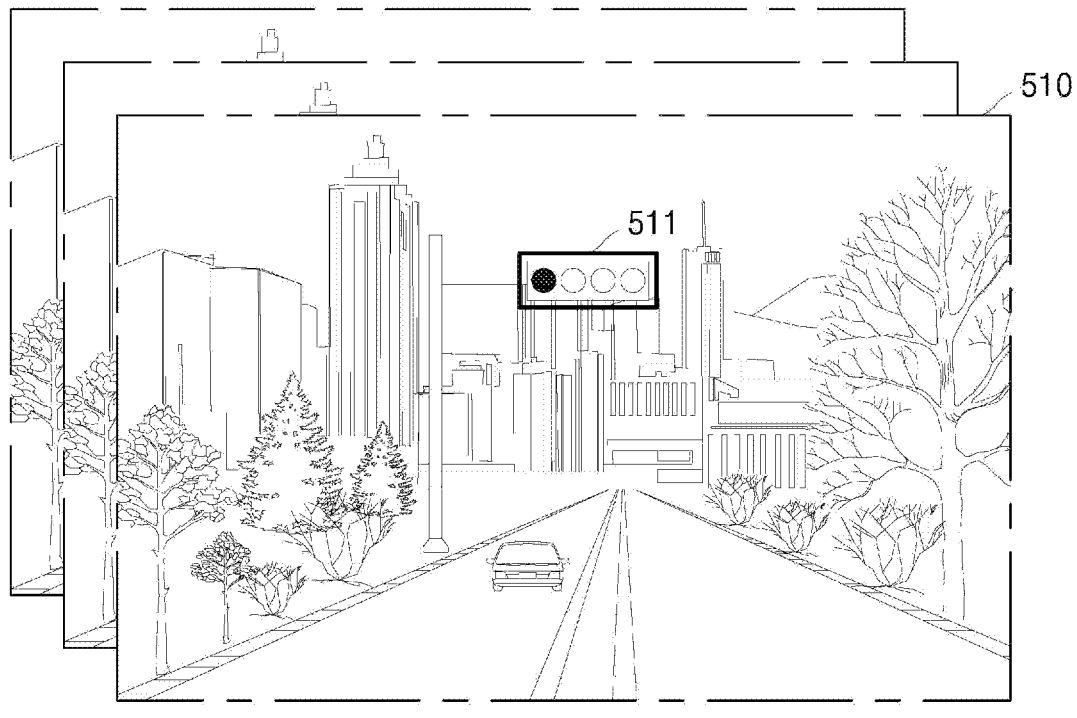
FIGS. 5A and 5B are views illustrating feature information included in image data, according to an embodiment.
Figure 5B:
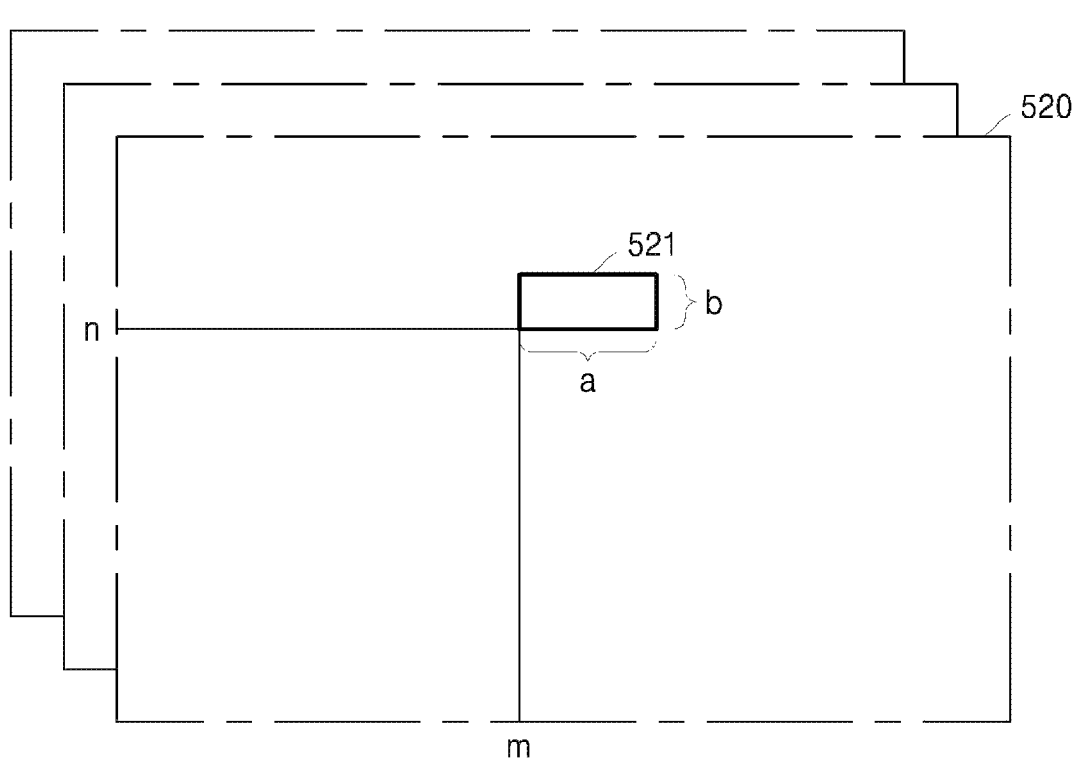

FIGS. 5A and 5B are views illustrating feature information included in image data, according to an embodiment.

When a vehicle travels on a road, a plurality of pieces of image data may be acquired from a camera mounted on the vehicle.

Image data 510, which is acquired from the camera mounted on the vehicle, may include an object 511. Referring to FIG. 5A, the object 511 may be a traffic light.

Image data may have a certain size M×N (M and N are natural numbers). The plurality of pieces of image data may include the same object 511, but when the vehicle travels along the road, relative locations of the vehicle and the object 511 continue to change, and accordingly, a location of even the same object 511 is changed in the respective pieces of image data.

When all of the pieces of image data are used to determine which object is the same in the respective pieces of image data, an amount of data transmission and an amount of computation increase considerably. Accordingly, the image data is not easy to be processed via edge computing in an apparatus mounted on the vehicle, and also is not easy to be analyzed in real time.

Referring to FIG. 5B, a feature 521 included in image data 520 is illustrated. The feature 521 is metadata regarding the object 511, and feature information may include object type information (a group, a class, and the like), location information of the object 511 on the image data 520, size information of the object 511, and the like. Referring to FIG. 5B, the feature information may include information that the object 511 corresponds to a traffic light class, information that the object 511 has a rectangular shape, information that a lower left vertex of the object 511 is located at (m, n) on the image data 520, and information that a size of the object 511 is a×b.

In the present disclosure, which object is the same within a plurality of pieces of image data may be determined by using feature information corresponding to metadata regarding an object without using all of the pieces of image data.

Figure 6A:
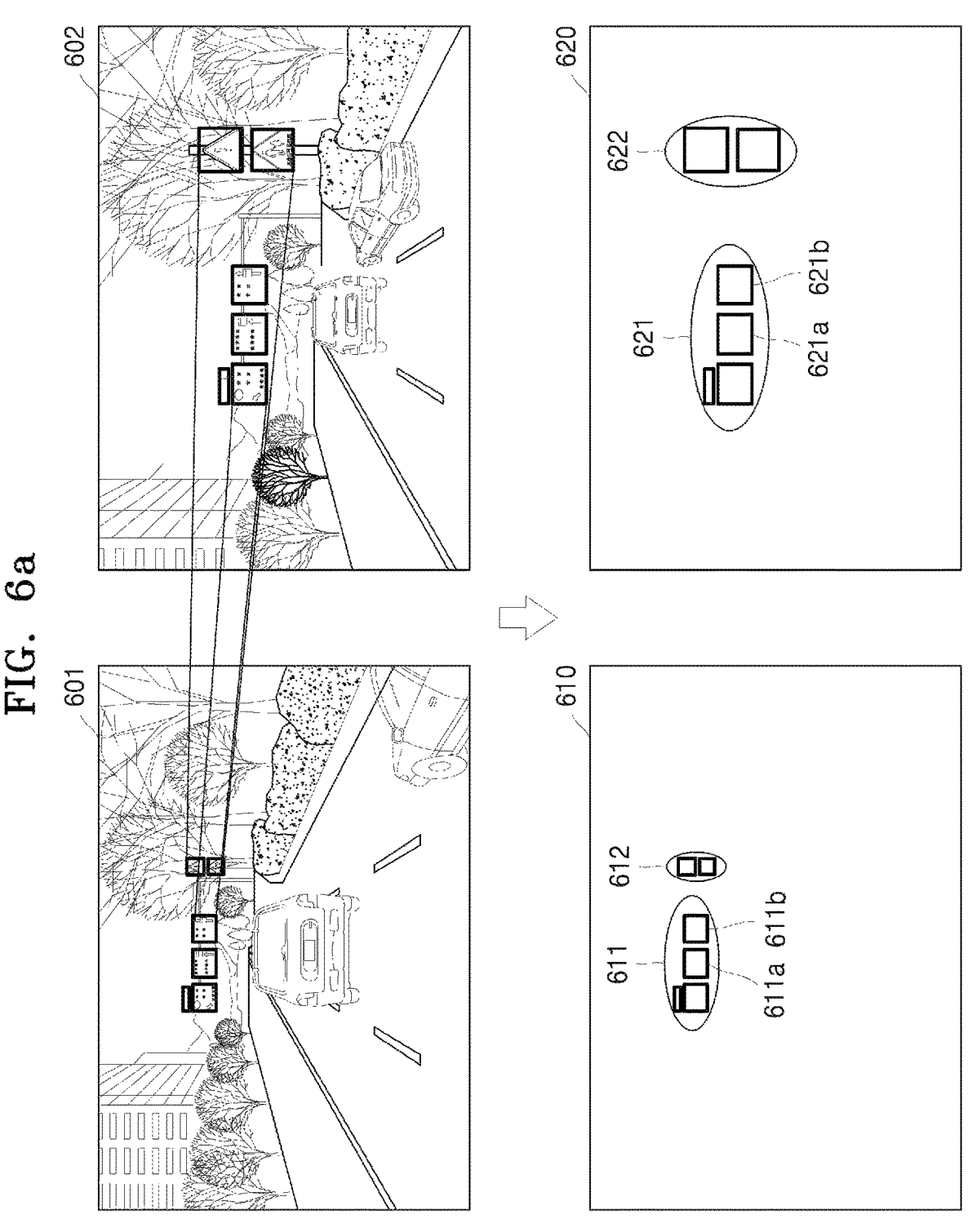
FIGS. 6A and 6B are example views illustrating feature aggregation within image data, according to an embodiment.
Figure 6B:
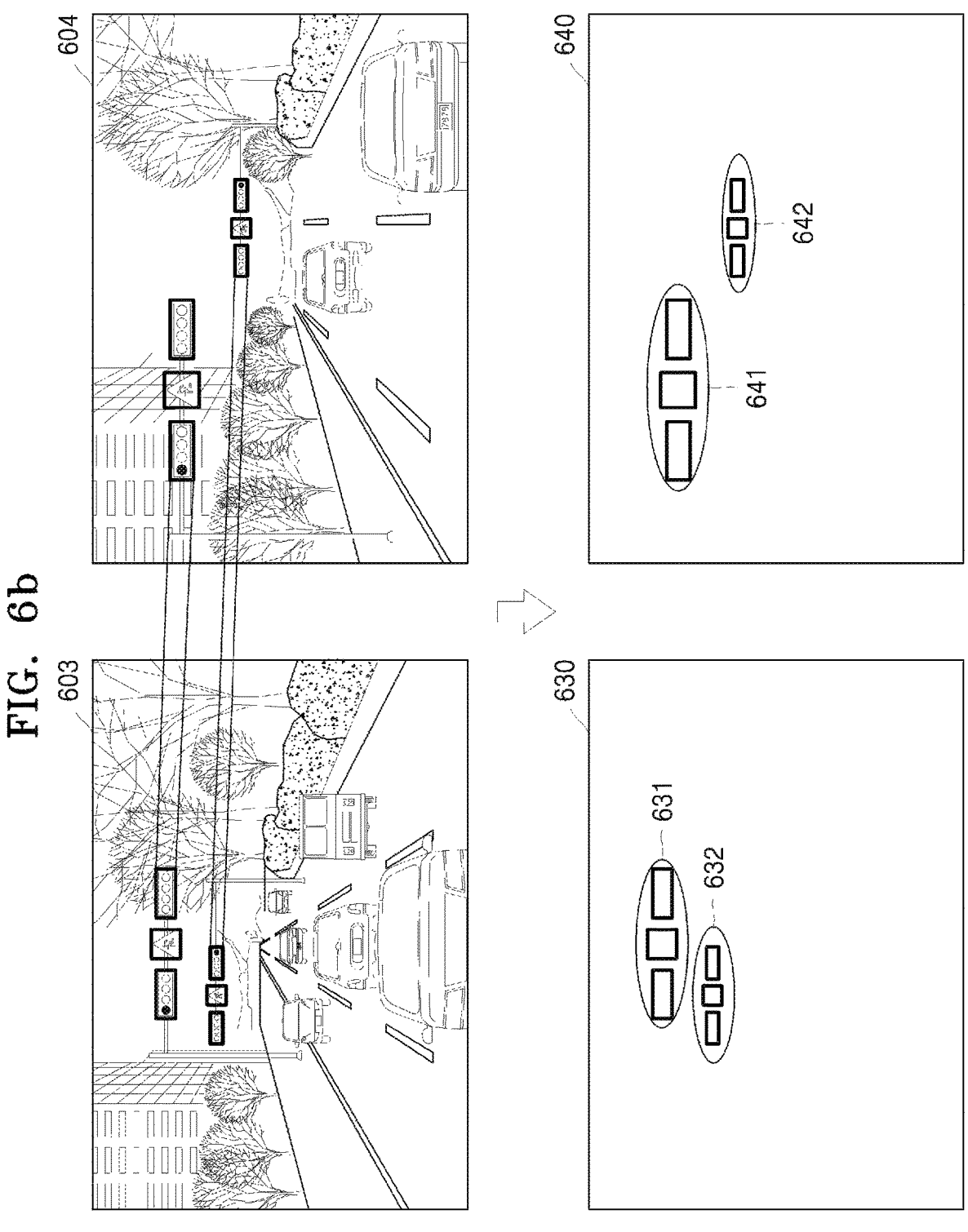

FIGS. 6A and 6B are example views illustrating feature aggregation within image data, according to an embodiment.

Referring to FIG. 6A, pieces of image data, which are acquired from a camera mounted on a vehicle at a particular point in time, are illustrated. First image data 610 is image data acquired at a first point in time, and second image data 620 is image data acquired at a second point in time after a certain time elapses from the first point in time.

Meanwhile, a first image 601 and a second image 602 are for assisting descriptions thereof, and illustrate views of an actual road photographed by the camera.

The first image data 610 and the second image data 620 include the same objects.

An apparatus for determining a location of an object on a lane map (hereinafter, referred to as an object location determination apparatus) may determine a plurality of features indicating the same object in a plurality of pieces of image data.

Referring to FIG. 6A, in the first image data 610, a first feature group 611 and a second feature group 612 may be located adjacent to each other. In other words, when a distance between objects corresponding to the first feature group 611 and the second feature group 612 and a vehicle is far, an actual distance difference between the objects corresponding to the first feature group 611 and the second feature group 612 may not be reflected, and the objects may be located adjacent to each other on the first image data 610.

In contrast, in the second image data 620, a first feature group 621 and a second feature group 622 may be located at a certain distance from each other. In other words, when the distance between the objects corresponding to the first feature group 611 and the second feature group 612 and the vehicle is closer than a location of the vehicle when the first image data 610 is captured, the actual distance difference between the objects corresponding to the first feature group 611 and the second feature group 612 may be further reflected, and thus, the objects may be located at a certain distance from each other on the second image data 620.

Meanwhile, in the first image data 610 and the second image data 620, the first feature groups 611 and 621 represent the same objects, and the second feature groups 612 and 622 represent the same objects, but sizes thereof may change according to image data.

As in the examples of the first image data 610 and the second image data 620, a plurality of features indicating the same object may be included in pieces of image data captured while the vehicle travels. However, locations of the vehicle and an object change from moment to moment while the vehicle travels, and thus, locations, sizes, positional relationships, and arrangement relationships, and the like of the plurality of features become different from each other on the respective pieces of image data.

The object location determination apparatus may determine a plurality of features corresponding to the same object in a plurality of pieces of image data by aggregating features within the plurality of pieces of image data.

The object location determination apparatus may determine the plurality of features corresponding to the same object in the plurality of pieces of image data, on the basis of a degree of correlation between the plurality of features included in the pieces of image data. The degree of correlation may be determined on the basis of an arrangement relationship, a size relationship, and the like between the plurality of features, but factors for determining the degree of correlation are not limited thereto.

In an embodiment, the object location determination apparatus may determine the plurality of features indicating the same object in the plurality of pieces of image data by using a graph-matching method.

The object location determination apparatus may register a graph including nodes and links by designating a plurality of features including a key feature as nodes in image data and setting connection relationships among the plurality of features as links. In addition, the object location determination apparatus may determine whether or not key features indicate the same object within different pieces of image data, via comparison between graphs registered from the different types of image data.

In detail, the object location determination apparatus may select a first feature 611a of the first image data 610 and a second feature 621a of the second image data 620, and search for other features around the first feature 611a and the second feature 621a. When a second neighbor feature 621b having a similar attribute to a first neighbor feature 611b around the first feature 611a is present around the second feature 621a, the object location determination apparatus may register a graph including, as key features of the first neighbor feature 611b and the second neighbor feature 621b, respectively, the first feature 611a and the second feature 621a. Here, an attribute may include at least one of a class, an aspect ratio of a feature, a distance, and an angle.

The object location determination apparatus may repeat an operation of searching for and an operation of registering all features around the first feature 611a. After attempting to construct a graph for all features around the first feature 611a, the object location determination apparatus may calculate a similarity between the first feature 611a and the second feature 621a, on the basis of on the number of features and a similarity between registered key features (e.g., sizes, a size relationship with a neighbor feature, or the like). The object location determination apparatus may determine that the second feature 621a of the second image data 620 having the highest similarity to the first feature 611a of the first image data 610 indicates the same object, by performing, with respect to remaining features other than the second feature 621a of the second image data 620, a retrieving operation, an operation of registering in a graph, a repeating operation, and an operation of calculating a similarity.

In the present disclosure, feature information corresponding to metadata regarding an object may be used without using all of pieces of image data. Accordingly, even when locations, sizes, location relationships, arrangement relationships, and the like of a plurality of features become different from each other on respective pieces of image data due to every-changing locations between the vehicle and an object while the vehicle travels, which object is the same within a plurality of pieces of image data may be determined.

Meanwhile, the object location determination apparatus may determine that features included in a graph have the same depth. Having the same depth may indicate that a lateral direction location of a road (a driving direction of the vehicle) is the same or within a certain range (e.g., 1 m).

When performing post-processing on a certain feature, the object location determination apparatus may perform the same post-processing on remaining features included in a graph, which have the same depth.

Referring to FIG. 6A, the object location determination apparatus may determine that a plurality of features included in the first feature groups 611 and 621 have the same depth, and a plurality of features included in the second feature groups 612 and 622 have the same depth. In this case, when correcting a location of a certain feature included in the first feature groups 611 and 621, the object location determination apparatus may similarly correct locations of remaining features included in the first feature groups 611 and 621.

Referring to FIG. 6B, pieces of image data, which are acquired from a camera mounted on a vehicle at a particular point in time, are illustrated. A location of the vehicle in a longitudinal direction on a road may be changed while the vehicle travels (e.g., a lane may be changed). First image data 630 is image data captured by a vehicle traveling on a first lane of the road, and second image data 640 is image data captured by the vehicle traveling on a fourth lane of the road.

Meanwhile, a first image 603 and a second image 604 are for assisting descriptions thereof and illustrate views of an actual road photographed by a camera.

The first image data 630 and the second image data 640 include the same objects.

The object location determination apparatus may determine a plurality of features indicating the same object in a plurality of pieces of image data.

Referring to FIG. 6B, a first feature group 631 and a second feature group 632 may be located adjacent to each other in the first image data 630. In addition, the first feature group 631 may be located on the right side of the second feature group 632. In other words, on the first image data 630 captured while the vehicle travels on the first lane, an arrangement relationship between the first feature group 631 and the second feature group 632 may be determined as described above according to a relative location relationship between the vehicle and a plurality of objects.

In contrast, in the second image data 640, a first feature group 641 and a second feature group 642 may be located at a certain distance from each other. In addition, the first feature group 641 may be located on the left side of the second feature group 642. In other words, on the second image data 640 captured while the vehicle travels on the fourth lane, an arrangement relationship between the first feature group 641 and the second feature group 642 may be determined as described above according to a relative location relationship between the vehicle and a plurality of objects.

Meanwhile, in the first image data 630 and the second image data 640, the first feature groups 631 and 641 indicate the same objects, and the second feature groups 632 and 642 indicate the same objects, but sizes thereof may be changed according to image data.

As in the examples of the first image data 630 and the second image data 640, a plurality of features indicating the same object may be included in pieces of image data captured while the vehicle travel. However, when locations between the vehicle and an object are changed according to on which lane the vehicle travels, locations, sizes, location relationships, arrangement relationships, and the like of the plurality of features become different from each other on the respective pieces of image data.

The object location determination apparatus may determine a plurality of features corresponding to the same object in a plurality of pieces of image data by aggregating features within the plurality of pieces of image data.

The object location determination apparatus may determine the plurality of features corresponding to the same object in the plurality of pieces of image data, on the basis of a degree of correlation between the plurality of features included in the pieces of image data.

The object location determination apparatus may determine the plurality of features corresponding to the same object in the plurality of pieces of image data by using the method described above with reference to FIG. 6B.

In the present disclosure, feature information corresponding to metadata regarding an object may be used instead of all of pieces of image data. Accordingly, in the present disclosure, even when locations, sizes, location relationships, arrangement relationships, and the like of a plurality of features become different from each other on respective pieces of image data due to a change in locations between the vehicle and an object when the vehicle travels on different driving lanes, which object is the same within a plurality of pieces of image data may be determined.

FIG. 7 is an example view illustrating a method of determining a location of an object on a lane map, according to an embodiment.

An object location determination apparatus may acquire location information of a vehicle by using a GPS mounted on the vehicle. The location information of the vehicle may be location information on a lane map.

In addition, the object location determination apparatus may determine the location of the object on the lane map by using location information of a plurality of features within image data, which are determined to correspond to the same object within a plurality of pieces of image data.

Referring to FIG. 7, as described above with reference to FIGS. 6A and 6B, in first image data 630 and second image data 640, first feature groups 631 and 641 may indicate the same objects, and second feature groups 632 and 642 may indicate the same objects.

In an embodiment, the object location determination apparatus may determine a location of an object on a lane map by using location information on the lane map, which is acquired via a location identification apparatus connected to a vehicle, the first image data 630, and the second image data 640. Meanwhile, the object location determination apparatus may use one to three pieces of image data to determine the location of the object on the lane map.

Referring to FIG. 7, the object location determination apparatus may determine a location of a first object group 710 corresponding to the first feature groups 631 and 641 and a location of a second object group 720 corresponding to the second feature groups 632 and 642, and display the determined locations on a lane map 700.

Figure 8:
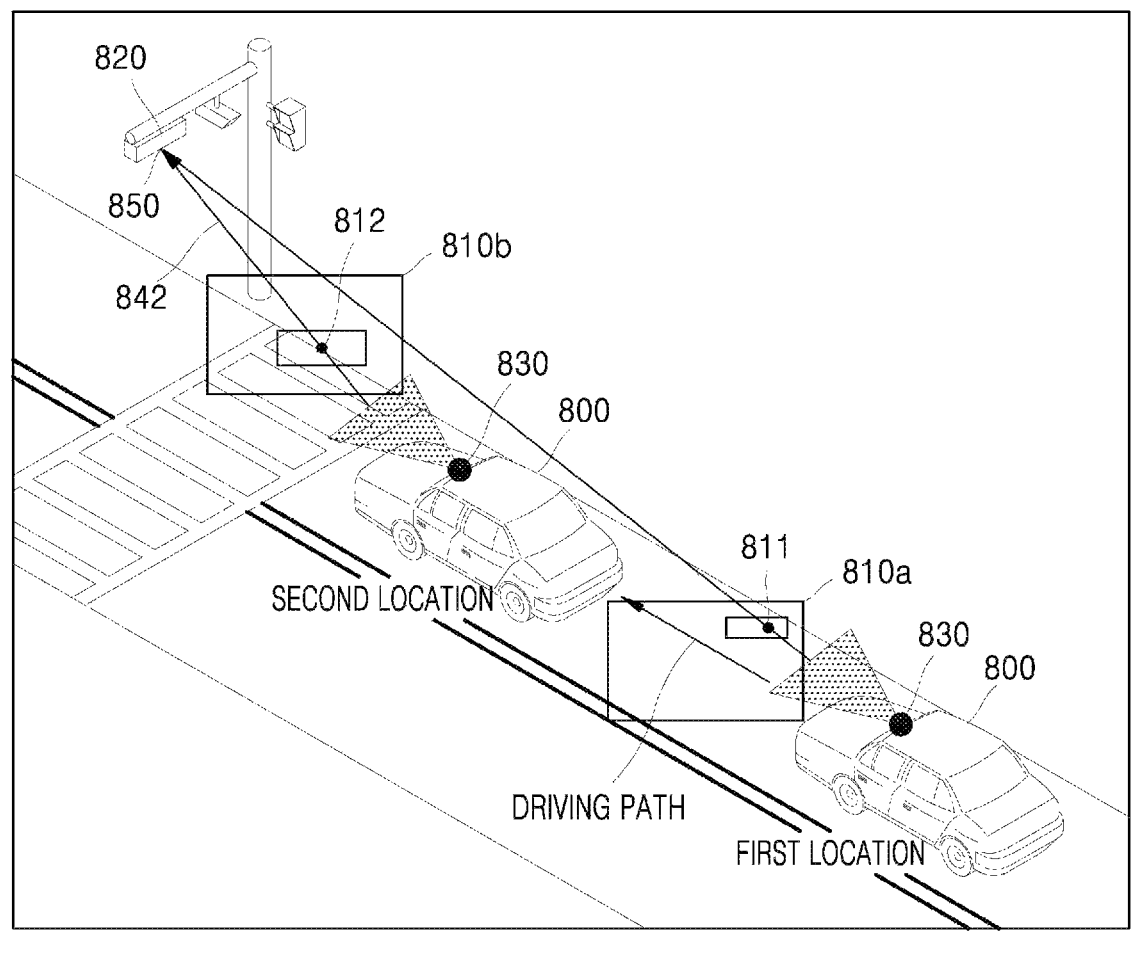
FIG. 8 is an example view illustrating a method of determining a location of an object on the basis of location information of a vehicle and a feature location on an image, according to an embodiment.

FIG. 8 is an example view illustrating a method of determining a location of an object on the basis of location information of a vehicle and a feature location on an image, according to an embodiment.

Referring to FIG. 8, a vehicle 800 moves from a first location to a second location along a driving path.

An object location determination apparatus may acquire location information of the vehicle 800 by using a GPS mounted on the vehicle 800, a location identification apparatus connected to the vehicle, or the like. The object location determination apparatus may acquire location information of the vehicle 800 on a lane map by using the location information of the vehicle 800.

The object location determination apparatus may acquire image data 810*a* and 810*b* around (in front of, on the side, in the rear of, or the like) the vehicle 800 from a camera 830 mounted on the vehicle 800.

First image data 810*a* is image data captured by the camera 830 when the vehicle 800 is located at the first location, and second image data 810*b* is image data captured by the camera 830 when the vehicle 800 is located at the second location.

The first image data 810*a* may include a first feature 811, and the second image data 810*b* may include a second feature 812. The first feature 811 and the second feature 812 indicate a traffic light 820 that is the same object.

The first feature 811 and the second feature 812 indicate the same object, but when the vehicle 800 moves from the first location to the second location, a relative distance between the vehicle 800 and the traffic light 820 is changed. Accordingly, locations, sizes, and the like of the features 811 and 812 indicating the traffic light 820 are changed within the image data 810*a* and 810*b* captured by the camera 830 of the vehicle 800.

The object location determination apparatus may determine a location of the object 820 on the lane map, on the basis of the location information of the vehicle 800 on the lane map and location information of the features 811 and 812 on the image data 810*a* and 810*b*.

In an embodiment, the object location determination apparatus may determine the location of the object 820 on the lane map by using a distance measurement method, but the method of determining the location of the object 820 on the lane map is not limited thereto.

In an embodiment, the object location determination apparatus may obtain a posture value of the camera 830. The posture value of the camera 830 may include factors related to an installation location, an installation direction, and an installation angle of the camera 830.

Referring to FIG. 8, the object location determination apparatus may determine a location of a point at which virtual rays starting from the camera 830 and passing through the features 811 and 812 on the image data 810*a* and 810*b* meet, by considering the posture value of the camera 830.

In detail, the vehicle 800 may be traveling from a first location to a second position. The feature 811 indicating the object 820 may be displayed in the first image data 810*a* captured by the camera 830 of the vehicle 800 located at the first location, and the feature 812 indicating the object 820 may be displayed in the second image data 810*b* captured by the camera 830 of the vehicle 800 located at the second location. The object location determination apparatus may determine a location 850 of a point at which a virtual first ray 841 starting from the camera 830 of the vehicle 800 at the first location and passing through the feature 811 on the first image data 810*a* and a virtual second ray 842 starting from the camera 830 of the vehicle 800 at the second location and passing through the feature 812 on the second image data 810*b* meet.

The object location determination apparatus may determine the location of the object 820 on the lane map, on the basis of a movement distance of the vehicle 800 and a location of a point at which virtual rays meet.

In detail, the object location determination apparatus may determine the location of the object 820 on the lane map by using the location 850 of the point at which the first ray 841 and the second ray 842 meet and a distance the vehicle 800 moves from the first location to the second location.

In an embodiment, the object location determination apparatus may further acquire a posture value of the vehicle 800. The posture value of the vehicle 800 may include factors related to a gradient of a road on which the vehicle 800 travels, a difference in air pressure between tires of the vehicle 800, and a steering angle of the vehicle 800.

The object location determination apparatus may determine a location of a point at which virtual rays starting from the camera 830 and passing through the features 811 and 812 on the image data 810*a* and 810*b* meet, by considering the posture value of the camera 830 and the posture value of the vehicle 800.

Figure 9:
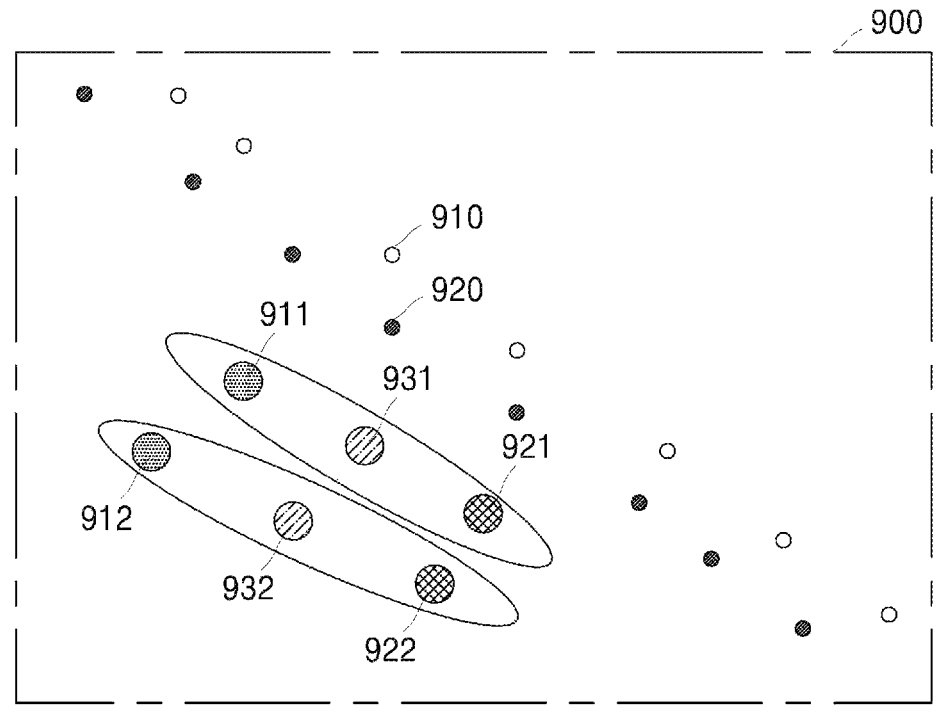
FIG. 9 is an example view illustrating a method of determining a location of an object on a lane map by using a plurality of driving trajectories, according to an embodiment.

FIG. 9 is an example view illustrating a method of determining a location of an object on a lane map by using a plurality of driving trajectories, according to an embodiment. Referring to FIG. 9, a first trajectory 910 and a second trajectory 920 of a vehicle, which travels on a certain road, are illustrated. In FIG. 9, a location of a $1^{st}$-1 object 911 and a location of a $1^{st}$-2 object 921 are locations determined on the basis of a plurality of pieces of image data captured while the vehicle travels along the first trajectory 910. In addition, a location of a $2^{nd}$-1 object 912 and a location of a $2^{nd}$-2 object 922 are locations determined on the basis of a plurality of pieces of image data captured while the vehicle travels along the second trajectory 920.

The $1^{st}$-1 object 911 and the $1^{st}$-2 object 921 are referred to as first group objects, and the $2^{nd}$-1 object 912 and the $2^{nd}$-2 object 922 are referred to as second group objects.

An object location determination apparatus may construct a first graph by using the first group objects, construct a second graph by using the second group objects, and determine the same object in the first group objects and the second group objects via similarity comparison between the first graph and the second graph.

In detail, on the basis of a certain object generated for each vehicle or each time, the object location determination apparatus may register, in a graph, the certain object and objects of the same class present around the certain object when the objects of the same class are present around the certain object (e.g., at a similar distance and direction from a lane), calculate a similarity on the basis of locations and the like, and determine objects having the highest similarity to be the same object, to calculate a degree of correlation between objects.

When the $1^{st}$-2 object 921 of the same class is present around the $1^{st}$-1 object 911, the object location determination apparatus may construct a first graph with the $1^{st}$-1 object 911 and the $1^{st}$-2 object 921 and may construct a second graph with the $2^{nd}$-1 object 912 and the $2^{nd}$-2 object 922. The object location determination apparatus may determine which object is the same object in respective graphs by comparing similarities by using respective objects as key objects in the graphs.

In FIG. 9, the object location determination apparatus may determine that the $1^{st}$-1 object 911 and the $2^{nd}$-1 object 912 indicate the same object, and the $1^{st}$-2 object 921 and the $2^{nd}$-2 object 922 indicate the same object.

The object location determination apparatus may aggregate locations of objects determined as the same object and display final locations of the respective objects on a lane map 900.

In FIG. 9, the object location determination apparatus may determine a location of a $1^{st}$-3 object 931 as a final location by aggregating locations of the $1^{st}$-1 object 911 and the $1^{st}$-2 object 921. In addition, the object location determination apparatus may determine a location of a $2^{nd}$-3 object 932 as a final location by aggregating locations of the $2^{nd}$-1 object 912 and the $2^{nd}$-2 object 922.

Figure 10:
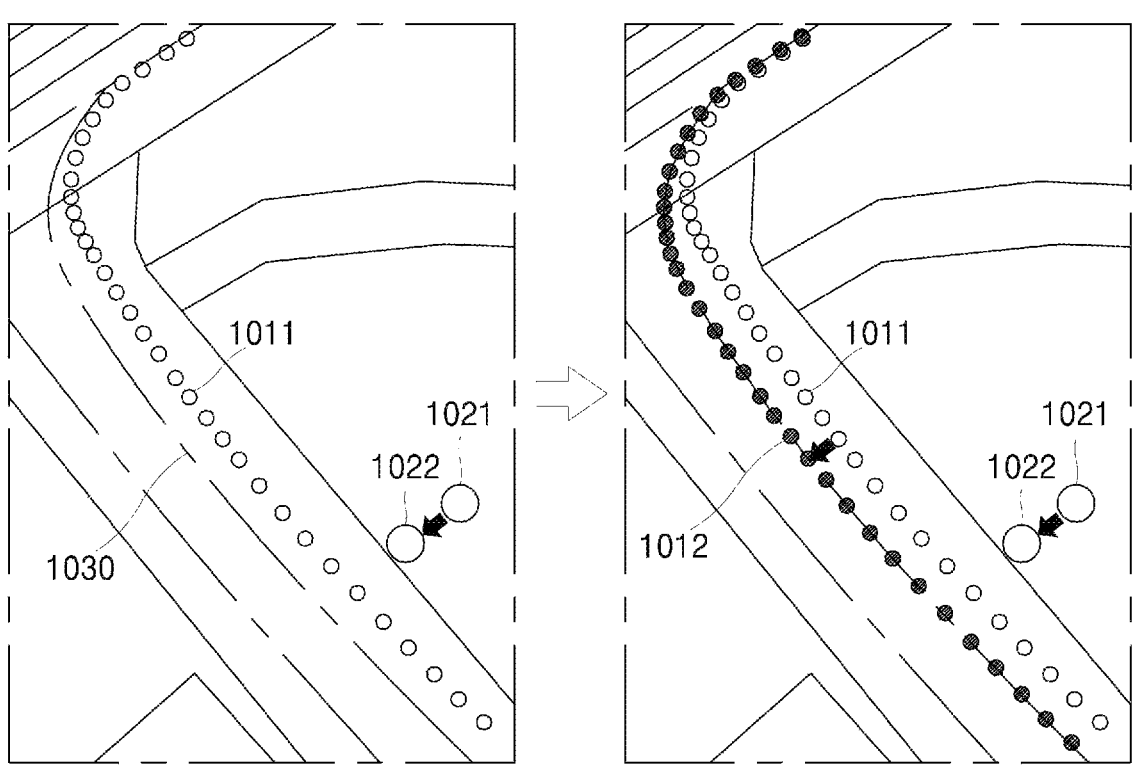
FIG. 10 is an example view illustrating lane fitting and object fitting methods according to an embodiment.

FIG. 10 is an example view illustrating lane fitting and object fitting methods according to an embodiment.

An object location determination apparatus may acquire a driving trajectory of a vehicle by using a location identification apparatus connected to the vehicle. The location identification apparatus may be a GPS, and hereinafter, the GPS is used as the location identification apparatus. In addition, the object location determination apparatus may map the acquired driving trajectory to a lane map 1000 and display the driving trajectory on the lane map 1000.

Referring to FIG. 10, the object location determination apparatus may acquire a first driving trajectory 1011 by using a GPS mounted on the vehicle and display the same on the lane map 1000.

Meanwhile, a GPS signal received from the GPS mounted on the vehicle may have an error due to various causes. For example, when the vehicle passes through an alley along which buildings are concentrated, reception of a GPS signal may be temporarily unstable. Alternatively, due to radio waves reflected by a glass surface of a building, the vehicle may receive a GPS signal having an error.

The object location determination apparatus may determine a current driving lane of the vehicle. Information regarding the current driving lane may be information included in feature information.

The object location determination apparatus may determine that the current driving lane of the vehicle is a certain lane 1030. In this case, the object location determination apparatus may identify that the first driving trajectory 1011 acquired from the GPS signal does not match the certain lane 1030. In detail, the object location determination apparatus may calculate a separation distance between the first driving trajectory 1011 acquired from the GPS signal and the certain lane 1030 and, when the separation distance exceeds a threshold value, determine that the first driving trajectory 1011 does not match the certain lane 1030. The same may be a case in which the first driving trajectory 1011 and the certain lane 1030 do not match each other due to the error in the GPS signal even though the vehicle currently travels on the certain lane 1030.

The object location determination apparatus may perform lane fitting so that a driving trajectory of the vehicle is fitted to a lane on a lane map, on the basis of a current driving lane included in feature information.

In detail, the object location determination apparatus may perform the lane fitting by considering a separation distance, a curvature, and the like between the driving trajectory of the vehicle and lane marking lines on the lane map. By linearly moving at least a portion of the driving trajectory of the vehicle and adjusting a curvature of at least a portion, the object location determination apparatus may perform the lane fitting so that the driving trajectory of the vehicle matches the lane marking lines on the lane map, which correspond to the current driving lane.

Referring to FIG. 10, the object location determination apparatus may perform lane fitting so that the first driving trajectory 1011 is fitted to the certain lane 1030 on the lane map, by linearly moving at least a portion of the first driving trajectory 1011 of the vehicle and adjusting a curvature of at least a portion to correct the first driving trajectory 1011 to a second driving trajectory 1012.

In an embodiment, an object 1021 may be displayed on the lane map 1000. The object location determination apparatus may perform object fitting so that a location of an object on the lane map 1000 is linked to the result of lane fitting and fitted.

Referring to FIG. 10, the object location determination apparatus may perform object fitting by correcting a location of the first object 1021 to a location of a second object 1022 in the same way that the first driving trajectory 1011 of the vehicle is corrected to the second driving trajectory 1012.

Meanwhile, the lane fitting may be performed before and/or after the image aggregation described above with reference to FIGS. 6 to 7 is completed.

FIG. 11 is a flowchart of a method of determining a location of an object on a lane map, according to an embodiment.

The method of determining a current lane of a vehicle, shown in FIG. 11, is related to the embodiments described in the drawings described above. Therefore, although the above description with reference to the drawings is omitted herein, the description may also be applied to the method of FIG. 11.

Referring to FIG. 11, in operation 1110, a processor may acquire image data captured by a camera mounted on a vehicle.

In operation 1120, the processor may generate feature information regarding a plurality of features included in the image data by performing certain processing on the image data.

The certain processing may include any processing method, which may generate feature information from image data, without limitation. In detail, the certain processing may include a processing method capable of generating, from image data, object type information (group, class, and the like), location information of an object on image data, size information of the object, and the like. For example, the certain processing may be implemented by a module for traffic lights detection (DLD), traffic signs detection (TSD), ego-lane recognition (ELR), intersection recognition (ELR), road markings detection (RMD), bump recognition (BR), or the like.

In operation 1130, the processor may determine a plurality of features corresponding to the same object in a plurality of pieces of image data, on the basis of a degree of correlation between the plurality of features included in the pieces of image data.

The processor may determine the plurality of features corresponding to the same object in the plurality of pieces of image data by aggregating the plurality of pieces of image data.

The processor may determine the plurality of features indicating the same object in the plurality of pieces of image data by using a graph-matching method.

The processor may select a first feature of first image data and a second feature of second image data, and may search for other features around the first feature and the second feature. When a second neighbor feature having a similar attribute to a first neighbor feature around the first feature is present around the second feature, the processor may register a graph including, as key features of the first neighbor feature and the second neighbor feature, respectively, the first feature and the second feature. Here, an attribute may include at least one of a class, an aspect ratio of a feature, a distance, and an angle.

The processor may repeat a retrieving operation and a registering operation on all features around the first feature. After attempting to construct a graph for all features around the first feature, the processor may calculate a similarity between the first feature and the second feature, on the basis of the number of features, a similarity between registered key features (e.g., sizes, a size relationship with a neighbor feature, or the like). The processor may determine that the second feature of the second image data having the highest similarity to the first feature of the first image data indicates the same object, by performing, on remaining features other than the second feature of the second image data, a retrieving operation, an operation of registering in a graph, a repeating operation, and an operation of calculating a similarity.

The processor may determine that features included in a graph have the same depth.

When performing post-processing on a certain feature, the processor may perform the same post-processing on remaining features included in the graph, which have the same depth.

In operation 1140, the processor may determine a location of an object on a lane map, on the basis of location information of a vehicle on the lane map and feature location information on the plurality of pieces of image data.

The processor may acquire the location information of the vehicle on the lane map by using a location identification apparatus connected to the vehicle.

The processor may determine the location of the object on the basis of the location information of the vehicle on the lane map and the feature location information on the pieces of image data.

The processor may determine the location of the object by using location information of the plurality of features determined to correspond to the same object in the plurality of pieces of image data.

In an embodiment, the object may include at least one of a traffic light, a road sign, a road marking, a current driving lane, an intersection, and a bump.

In an embodiment, the processor may acquire a driving trajectory of the vehicle by using the location identification apparatus connected to the vehicle. In addition, the processor may perform lane fitting so that the driving trajectory of the vehicle is fitted to a lane on the lane map, on the basis of a current driving lane included in feature information.

In an embodiment, the processor may perform object fitting so that the location of the object on the lane map is linked to the result of the lane fitting and fitted.

In an embodiment, the processor may display, on the lane map, first locations of first group objects determined from a first trajectory of the vehicle which travels on a certain road. In addition, the processor may display, on the lane map, second locations of second group objects determined from a second trajectory of the vehicle which travels on the certain road. In addition, the processor may determine the same object in the first group objects and the second group objects, aggregate locations of objects determined to be the same object, and display final locations of the respective objects on the lane map.

In an embodiment, the processor may construct a first graph by using the first group objects, construct a second graph by using the second group objects, and determine the same object in the first group objects and the second group objects via similarity comparison between the first graph and the second graph.

Figure 12:
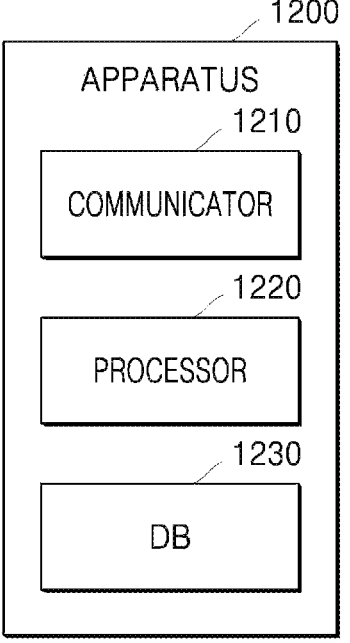
FIG. 12 is a block diagram of an apparatus for determining a location of an object, according to an embodiment.

FIG. 12 is a block diagram of an object location determination apparatus according to an embodiment.

Referring to FIG. 12, an object location determination apparatus 1200 may include a communicator 1210, a processor 1220, and a DB 1230. The object location determination apparatus of FIG. 12 illustrates only components related to an embodiment. Therefore, it may be understood by one of ordinary skill in the art that other general-purpose components may be further included in addition to the components shown in FIG. 12. In addition, in an embodiment, the object location determination apparatus 1200 may not include the communicator 1210.

The communicator 1210 may include one or more components that enable wired/wireless communication with an external server or an external apparatus. For example, the communicator 1210 may include at least one of a short-range communicator (not shown), a mobile communicator (not shown), and a broadcast receiver (not shown).

The DB 1230 may be hardware for storing various types of data processed within the object location determination apparatus 1200, and may store programs for processing and controlling by the processor 1220. The DB 730 may store payment information, user information, and the like.

The DB 1230 may include random access memory (RAM), such as dynamic random access memory (DRAM) and static random access memory (SRAM), read-only memory (ROM), electrically erasable programmable read-only memory (EEPROM), CD-ROM, Blu-ray or other optical disk storages, a hard disk drive (HDD), a solid state drive (SSD), or flash memory.

The processor 1220 controls overall operation of the object location determination apparatus 1200. For example, the processor 1220 may generally control an input unit (not shown), a display (not shown), the communicator 1210, the DB 1230, and the like by executing the programs stored in the DB 1230. The processor 1220 may control an operation of the object location determination apparatus 1200 by executing the programs stored in the DB 1230.

The processor 1220 may control at least some of the operations of the object location determination apparatus described above with reference to FIGS. 1 to 11.

The processor 1220 may be implemented by using at least one of application specific integrated circuits (ASICs), digital signal processors (DSPs), digital signal processing devices (DSPDs), programmable logic devices (PLDs), field programmable gate arrays (FPGAs), controllers, micro-controllers, microprocessors, and electrical units for performing other functions.

In an embodiment, the object location determination apparatus 1200 may be an electronic apparatus having mobility. For example, the traffic information provision apparatus may be implemented as a smartphone, a tablet PC, a PC, a smart TV, a personal digital assistant (PDA), a laptop computer, a media player, a navigation system, a device having a camera mounted thereon, and other mobile electronic devices. In addition, the object location determination apparatus 1200 may be implemented as a wearable device, such as a watch, glasses, a hair band, and a ring having a communication function and a data processing function.

In an embodiment, the object location determination apparatus 1200 may be an electronic apparatus embedded in a vehicle. For example, the object location determination apparatus 1200 may be an electronic apparatus inserted into a vehicle via tuning after a production process thereof.

In an embodiment, the object location determination apparatus 1200 may be a server located outside a vehicle. The server may be implemented as a computer apparatus or a plurality of computer apparatuses that perform communication over a network to provide commands, codes, files, content, services, and the like. The server may receive data needed for determining a movement path of the vehicle from apparatuses mounted on the vehicle, and may determine the movement path of the vehicle on the basis of the received data.

In an embodiment, a process performed by the object location determination apparatus 1200 may be performed by at least some of an electronic apparatus having mobility, an electronic apparatus embedded in a vehicle, and a server located outside the vehicle.

Embodiments according to the present disclosure may be implemented in the form of a computer program that may be executed on a computer via various types of components, and the computer program may be recorded on a computer-readable medium. Here, the medium may include magnetic media, such as a hard disk, a floppy disk, and a magnetic tape, optical recording media, such as CD-ROM and DVD, magneto-optical media, such as a floptical disk, and hardware devices, such as ROM, RAM, and flash memory devices specially configured to store and execute program instructions.

Meanwhile, the computer program may be specially designed and configured for the present disclosure, or may be known to and used by those skilled in the art of the computer software field. Examples of the computer program may include not only machine language code generated by a compiler but also high-level language code that may be executed by a computer by using an interpreter or the like.

According to one embodiment, the method according to various embodiments of the present disclosure may be included and provided in a computer program product. The computer program product may be traded between a seller and a buyer as a product. The computer program product may be distributed in the form of a device-readable storage medium (e.g., compact disc read only memory (CD-ROM)), or may be distributed (e.g., downloaded or uploaded) online via an application store (e.g., Play Store™) or between two user devices. When distributed online, at least a portion of the computer program product may be at least temporarily stored or temporarily generated in a device-readable storage medium such as a server of a manufacturer, a server of an application store, or a memory of a relay server.

The operations constituting the method according to the present disclosure may be performed in any appropriate order unless an order of the operations is explicitly stated or stated to the contrary. The present disclosure is not necessarily limited according to the order of description of the operations. The use of all examples or example terms (e.g., and the like) in the present disclosure is simply to describe the present disclosure in detail, and the scope of the present disclosure is limited due to the examples or example terms unless limited by claims. In addition, those skilled in the art may appreciate that various modifications, combinations and changes may be made according to design conditions and factors within the scope of the appended claims or equivalents thereof.

Therefore, the spirit of the present disclosure should not be determined while limited to the embodiments described above, and all scopes equivalent to or equivalently changed from the claims as well as the claims described below should fall within the scope of the spirit of the present disclosure.

The invention claimed is:

1. A method of determining a location of an object on a lane map, the method comprising:

acquiring image data captured by a camera mounted on a vehicle;

generating feature information regarding a plurality of features included in the image data by performing certain processing on the image data;

determining a plurality of features corresponding to a same object in a plurality of pieces of image data, on the basis of a degree of correlation determined on the basis of an arrangement relationship and a size relationship between the plurality of features included in the image data;

determining locations of objects corresponding to the plurality of features on the lane map, on the basis of location information of the vehicle on the lane map and feature location information on the plurality of pieces of image data; and displaying a final location of an object determined as the same object on the lane map by aggregating the determined locations of the objects corresponding to the plurality of features, the determining of the plurality of features corresponding to the same object further comprising:

searching for neighbor feature existing around each of the first feature of the first image data and the second feature of the second image data among the plurality of image data;

registering a graph including the first feature and the second feature as key features for each of the first neighbor feature and the second neighbor feature based on a result of searching for the first neighbor feature and the second neighbor feature; and determining the first feature of the first image data and the second feature of the second image data indicates the same object based on the similarity between the registered key features.

2. The method of claim 1, wherein the object comprises at least one of a traffic light, a road sign, a road marking, and a bump.

3. The method of claim 1, wherein the determining of the plurality of features corresponding to the same object comprises determining a plurality of features corresponding to a same object in a plurality of pieces of image data by aggregating features within the plurality of pieces of image data.

4. The method of claim 1, wherein the determining of the plurality of features corresponding to the same object comprises determining a plurality of features indicating a same object in a plurality of pieces of image data by using a graph-matching method.

5. The method of claim 4, further comprising:

selecting a first feature of first image data and a second feature of second image data;

searching for other features around the first feature and the second feature;

when a second neighbor feature having a similar attribute to a first neighbor feature around the first feature is present around the second feature, registering a graph including, as key features of the first neighbor feature and the second neighbor feature, respectively, the first feature and the second feature;

repeating, on all features around the first feature, the searching for and the registering;

after attempting to construct a graph for all features around the first feature, calculating a similarity between the first feature and the second feature, on the basis of a number of features and a similarity between registered key features; and determining that the second feature of the second image data having a highest similarity to the first feature of the first image data indicates a same object, by performing, on remaining features other than the second feature of the second image data, the searching for, the registering of the graph, the repeating, and the calculating of the similarity.

6. The method of claim 5, further comprising determining that features included in the graph have a same depth.

7. The method of claim 6, further comprising, when performing post-processing on a certain feature, performing the same post-processing on remaining features included in the graph, which have the same depth.

8. The method of claim 5, wherein the attribute comprises at least one of a class, an aspect ratio of a feature, a distance, and an angle.

9. The method of claim 1, further comprising acquiring location information of the vehicle on the lane map by using a location identification apparatus connected to the vehicle.

10. The method of claim 1, further comprising:

displaying, on the lane map, first locations of first group objects determined from a first trajectory of the vehicle which travels on a certain road;

displaying, on the lane map, second locations of second group objects determined from a second trajectory of the vehicle which travels on the certain road; and determining a same object in the first group objects and the second group objects, aggregating locations of objects determined to be the same object, and displaying final locations of the respective objects on the lane map.

11. The method of claim 10, wherein the displaying of the final locations of the respective objects on the lane map comprises constructing a first graph by using the first group objects, constructing a second graph by using the second group objects, and determining a same object in the first group objects and the second group objects via similarity comparison between the first graph and the second graph.

12. An apparatus for determining a location of an object on a lane map, the apparatus comprising:

a memory storing at least one program; and a processor configured to perform a calculation by executing the at least one program, wherein the processor is configured to: acquire image data captured by a camera mounted on a vehicle; generate feature information regarding a plurality of features included in the image data by performing certain processing on the image data; determine a plurality of features corresponding to a same object in a plurality of pieces of image data, on the basis of a degree of correlation determined on the basis of an arrangement relationship and a size relationship between the plurality of features included in the image data; determine locations of objects corresponding to the plurality of features on the lane map, on the basis of location information of the vehicle on the lane map and feature location information on the plurality of pieces of image data; and display a final location of an object determined as the same object on the lane map by aggregating the determined locations of the objects corresponding to the plurality of features, where in search for neighbor feature existing around each of the first feature of the first image data and the second feature of the second image data among the plurality of image data; register a graph including the first feature and the second feature as key features for each of the first neighbor feature and the second neighbor feature based on a result of searching for the first neighbor feature and the second neighbor feature; and determine the first feature of the first image data and the second feature of the second image data indicates the same object based on the similarity between the registered key features.

13. A non-transitory computer-readable recording medium having recorded thereon a program for executing the method of claim 1 on a computer.

* * * * *